(12) United States Patent
Thurston

(10) Patent No.: US 10,938,217 B2
(45) Date of Patent: Mar. 2, 2021

(54) USING ADAPTABLE AND MODULAR MOBILE CONTAINERS TO PROVIDE AND MANAGE DIGITAL AND ANALOG RESOURCES

(71) Applicant: Wright W. Thurston, Midway, UT (US)

(72) Inventor: Wright W. Thurston, Midway, UT (US)

(*) Notice: Subject to any disclaimer, the term of this patent is extended or adjusted under 35 U.S.C. 154(b) by 225 days.

(21) Appl. No.: 16/039,274

(22) Filed: Jul. 18, 2018

(65) Prior Publication Data

US 2019/0027938 A1 Jan. 24, 2019

Related U.S. Application Data

(60) Provisional application No. 62/534,159, filed on Jul. 18, 2017.

(51) Int. Cl.
| | |
|---|---|
| *H02J 3/38* | (2006.01) |
| *F03B 17/06* | (2006.01) |
| *F03D 9/25* | (2016.01) |
| *F03D 9/11* | (2016.01) |
| *F03D 9/30* | (2016.01) |
| *F03B 13/00* | (2006.01) |
| *H02J 3/32* | (2006.01) |

(52) U.S. Cl.
CPC .............. *H02J 3/383* (2013.01); *F03B 13/00* (2013.01); *F03B 17/06* (2013.01); *F03D 9/30* (2016.05); *H02J 3/32* (2013.01); *F03D 9/11* (2016.05); *F03D 9/255* (2017.02); *F05B 2240/142* (2013.01); *G05B 2219/2619* (2013.01); *H02J 3/382* (2013.01)

(58) Field of Classification Search
CPC .. F03B 13/00; F03B 17/06; F03D 9/11; F03D 9/255; F03D 9/30; F05B 2240/142; H02J 3/32; H02J 3/382; H02J 3/383
See application file for complete search history.

(56) References Cited

U.S. PATENT DOCUMENTS

2019/0364492 A1* 11/2019 Azizi .................... H04W 48/10

* cited by examiner

*Primary Examiner* — Chad G Erdman
(74) *Attorney, Agent, or Firm* — Dodd Law Group; Michael B. Dodd

(57) ABSTRACT

The present invention extends to methods, systems, and computer program products for using adaptable and modular mobile container in different environments to provide and manage digital and analog resources. One or more mobile containers can be placed in a location to take advantage of resource availability, generation, and/or distribution at the location. Per mobile container, different numbers and/or combinations of digital and analog components can be configured for use with and contained within or attached to the mobile container to provide different numbers and/or combinations of functionality. The number and/or combination of components and functionalities associated with a mobile container can be tailored to the environment where the mobile container is to be located.

20 Claims, 2 Drawing Sheets

USING ADAPTABLE AND MODULAR MOBILE CONTAINERS TO PROVIDE AND MANAGE DIGITAL AND ANALOG RESOURCES

CROSS-REFERENCE TO RELATED APPLICATIONS

This application claims the benefit of and priority to U.S. Provisional Patent Application Ser. No. 62/534,159 entitled "USING ADAPTABLE AND MODULAR MOBILE CONTAINERS IN DIFFERENT ENVIRONMENTS TO PROVIDE AND MANAGE DIGITAL AND ANALOG RESOURCES", filed Jul. 18, 2017 by Wright W. Thurston et al., the entire contents of which are expressly incorporated by reference.

BACKGROUND

Background and Relevant Art

Resource creation at a location and/or utilization of resources created at a location can change over time. When the price of fossil fuels is higher, solar and/or wind power generation is a more viable alternative. Investment may be made in solar and/or wind farms to generate electrical power and in transmission infrastructure for transferring electrical power to the commercial grid. For example, a solar farm can be installed on otherwise undeveloped land in a less populated area that has requisite yearly sunlight. The solar farm can generate electrical power and transmit the electrical power for sale to the commercial power grid.

Subsequently, the price of fossil fuels may drop, making the solar farm less viable (and potentially not profitable). The owner may choose to operate at reduced capacity or may choose to stop generating power. For example, the owner may sell some but not all of the generated power to the electrical grid. Thus, the solar farm is underutilized if not completely unused.

Similar difficulties are associated with wind farms.

High speed network connections can be available in many different locations, including some locations that are remote and/or uninhabited. For example, high speed network cables can run between cities, states, countries, etc. often across long distances. The path of the high speed network cables can run across remote areas. However, connecting to the high speed network cables in the remote areas is difficult due to lack of other resources, including electrical power.

BRIEF SUMMARY

Examples extend to methods, systems, and computer program products for using adaptable and modular mobile container in different environments to provide and manage digital and analog resources.

A mobile container can be placed in a location to take advantage of resource availability, generation, and/or distribution at the location. In one aspect, a mobile container is placed at a location to take advantage of generated and/or distributed resources (e.g., electrical power, network connections, etc.) at the location. In another aspect, a mobile container is placed at a location to generate and/or provide a resource (e.g., electrical power, network connections, etc.) at the location. In a further aspect, a mobile container is placed at a location to consume at least one resource and provide at least one other resource.

Different numbers and/or combinations of digital and analog components can be configured for use with and contained within or attached to a mobile container to provide different numbers and/or combinations of functionality. The number and/or combination of components and functionalities associated with a mobile container can be tailored to the environment where the mobile container is to be located.

The external dimensions and surfaces of mobile containers can vary. Mobile containers of varying and differing sizes can be configured for connecting to one another and to other mobile containers. Mobile containers can be modularly combined to scale vertically, horizontally, or through other external physical connectivity between mobile containers. When mobile containers are connected, connectors at the mobile containers can be mechanically coupled to provide digital and analog connections between components included in each mobile container.

When an operating environment changes, components within and/or attached to the mobile container can be changed/re-configured to adapt to the new environment. When space inside a mobile container is fully utilized, other mobile containers can be modularly connected to scale (e.g., add or change) functionality. Mobile containers can be connected to one another and disconnected from one another as appropriate. When an operating environment is no longer useful, mobile containers can be removed from the environment. When a mobile container is removed from one location it can be repositioned in another location. When appropriate, the mobile container can be changed and/or re-configured prior to repositioning.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
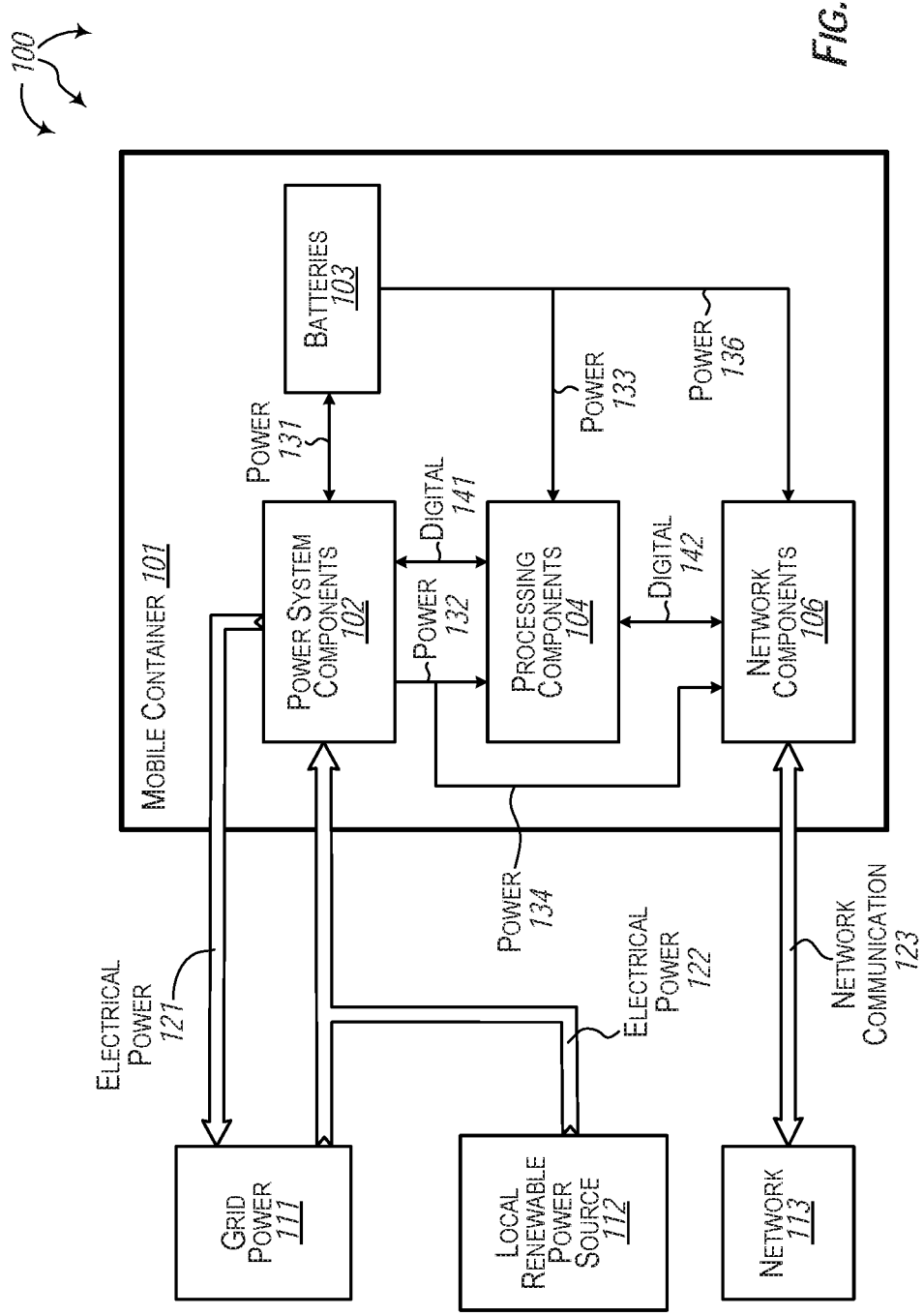
FIG. 1 illustrates an example mobile container architecture for providing and manage digital and analog resources.

Examples extend to apparatus, devices, methods, systems, and computer program products for using adaptable and modular mobile containers in different environments to provide and manage digital and analog resources.

A mobile container can be placed in a location to take advantage of resource availability, generation, and/or distribution at the location. In one aspect, a mobile container is placed in a location to take advantage of electrical energy generation and/or distribution at the location. That is, a mobile container may be placed in a location where generated electrical energy is relatively inexpensive and/or is underutilized. For example, a mobile container can be placed in close proximity to a renewable energy source that is producing excess electrical energy (i.e., not all produced energy is being purchased through the electrical grid). Alternatively, a mobile container may be placed in a location where electrical energy can be relatively inexpensively harvested from natural resources. For example, a mobile container with solar panels can be placed in a location that typically receives increased amounts of sunlight.

In another aspect, a mobile container is placed in a location to take advantage of network resources. For example, a mobile container can be placed in close proximity to a high speed network cable or placed in a location where there is a strong wireless signal.

Different numbers and/or combinations of digital and analog components can be configured for use with and contained within or attached to a mobile container to provide different numbers and/or combinations of functionality. The number and/or combination of components and functionalities associated with a mobile container can be tailored to the environment where the mobile container is to be located. Components configured for use with and contained within or attached to a mobile container can include: processors, ASICs, PLAs, FPGAs, other programmable logic components, system memory, durable storage, network interface cards, wireless signal repeaters, wireless signal amplifiers, wireless signal generators, antennas, cooling equipment, power regulation equipment, power conversion equipment (e.g., to convert from a renewable source to electrical grid power), batteries (e.g., based on lithium polymer or graphene materials), connections tailored for connecting to other mobile containers, connections for connecting to an electrical grid, connections for connecting to a renewable energy source (either separate from and/or attached to the mobile container), solar panels, wind turbines, connections for connecting to a network, etc.

The external dimensions and surfaces of mobile containers can vary. Mobile containers of varying and differing sizes can be configured for connecting to one another and to other mobile containers. Mobile containers can be modularly combined to scale vertically, horizontally, or through other external physical connectivity between mobile containers. When mobile containers are connected, connectors at the mobile containers can be mechanically coupled to provide digital and analog connections between components included in each mobile container.

A mobile container can provide various different functionalities based on components included in the mobile container. For example, a mobile container containing processors can perform computing operations. The computing operations can be relatively computationally intense, such as, for example, validating transactions (or portions thereof) for a cryptocurrency public distributed ledger (e.g., performing block chain computations).

A mobile container containing power conversion and regulation equipment can receive power from a renewable energy source and convert and clean up the power. Components for harvesting renewable energy resources (e.g., solar panels) can be attached a mobile container. Other components for harvesting renewable energy resources (e.g., a wind farm or hydroelectric generator) can be separate from but connected to a mobile container. Harvested power can be stored in batteries, used to power other components in the mobile container, used to power components in other mobile containers (through appropriate inter-container connections), or distributed onto an electrical grid.

A mobile container with batteries can store electrical energy in the batteries. Stored electrical energy can be used to power other components in the mobile container, to power components in other mobile containers (through appropriate inter-container connections), or for distribution onto an electrical grid.

A mobile container containing a network interface card can receive wired (e.g., copper wire, coaxial, fiber optic, etc.) and/or wireless network communication (e.g., to the Internet). A mobile container containing wireless signal repeaters and/or amplifiers can receive a wireless signal and repeat and/or amplify the wireless signal. Repeating and/or amplifying the wireless signal may propagate wireless network coverage to underserved areas. Repeating and/or amplifying the wireless signal may also propagate the wireless signal into space for satellite communication. The mobile container can operate essentially as a "hot spot" to interface data to other networks (e.g., the Internet).

A mobile container containing a wireless signal generator can generate a wireless signal to form a wireless network. The wireless signal generator can use a wired network connection (e.g., copper wire, coaxial, fiber optic, etc.) at mobile container to interface data between the wireless network and other networks (e.g., the Internet). A generated wireless signal may propagate wireless network coverage to underserved areas. A generated wireless signal can also be propagated into space for satellite communication.

Wireless communication can be based on WiFi, WiMax, LTE, 4G, 5G, protocols for communicating with satellites, or other wireless standards using variable or uniformly sized packets.

In general, the components contained within and/or attached to a mobile container can be tailored to the operating environment. When an operating environment changes, components within and/or attached to the mobile container can be changed/re-configured to adapt to the new environment. When space inside a mobile container is fully utilized, other mobile containers can be modularly connected to scale (e.g., add or change) functionality. Mobile containers can be connected to one another and disconnected from one another as appropriate. When an operating environment is no longer useful, all mobile containers can be removed. When a mobile container is removed from one location it can be repositioned in another location. When appropriate, the mobile container can be changed and/or re-configured prior to repositioning.

In one aspect, local inter-container connections are facilitated by cables and/or connectors that are specifically configured for local inter-container connections. Mobile containers as well as cables can include processing resources for identifying compatible connections. For example, a cable can include connectors on each end and a processor or other logic to identify compatible mobile containers. When a cable connector is plugged into a corresponding connector on a mobile container, the cable can verify the that the connection is to a compatible mobile container. Similarly, the mobile container can verify that the cable is a compatible cable. If a cable or mobile container is determined to be incompatible, the cable or mobile container can block signals from exiting the mobile container and/or flowing through the cable.

When mobile containers are connected to one another (either by a cable or direct connection), the mobile containers can also verify compatibility with one another. If a mobile container does not verify compatibility, the mobile container prevents communication with the incompatible device.

Locally inter-connected mobile containers can be grouped to form a local container area network. Locally inter-connected mobile containers can share resources with one another over a local container area network.

Geographical dispersed mobile containers can be also connected to one another over wide area network connections (e.g., the Internet). Accordingly, networked systems of mobile containers and/or network systems of local container area networks can be formed. The number of mobile containers in a networked system can vary as mobile containers are removed from one location and repositioned in another location. Different groups of mobile containers can form different networked systems.

Form factor, size, and weight of mobile containers can be designed/configured to facilitate efficient movement between locations using known modes of transportation, such as, for example, car, truck, tractor trailer, train, airplane, etc. For example, smaller mobile containers (e.g., around the size of a briefcase or toaster) can be designed to fit in the trunk of passenger cars. Other larger mobile containers (e.g., around the size of a shipping container) can be designed to fit on a tractor trailer without causing an oversized load.

Mobile containers can be configured so that components within a mobile container are efficiently accessible for maintenance, replacement, upgrades, etc.

Mobile containers can be connected to multiple power sources to provide redundancy. For example, a mobile container can be connected to a solar or wind farm and to an electrical power grid. A power management component at the mobile container can manage power consumption from redundant sources to balance cost versus having sufficient power to power other components within the mobile container. For example, during a sunny day nearly all electrical power for a mobile container may be provided by a solar farm and/or attached solar panels. At night, electrical power can be accessed from battery storage and/or from the electrical power grid.

FIG. 1 illustrates an example architecture using a mobile container in an environment 100 to provide and manage digital and analog resources. As depicted, environment 100 includes mobile container 101, grid power 111, local renewable power source 112, and network 113. Environment 100 can be physically located in a relatively rural area and in the vicinity of local renewable power source 112. Local renewable power source 112 can be a solar farm, a wind farm, a hydroelectric generator, etc. Mobile container 101 can be placed into environment 100 to take advantage of power from local renewable power source 112 which is otherwise underutilized (or may itself generate power using the same renewable resource).

Grid power 111 can be "Mains electricity" (varying by country and customer requirements). Within the Americas a 60 Hz AC, a 120/240 volt split phase system can be used domestically and three phase for larger installations. In this description and the following claims, the "power grid" or simply the "grid" is defined as a combined transmission network (including any optional sub transmission networks) and distribution network for (e.g., three phase) electrical power.

Network 113 can be a wired and/or wireless network, for example, providing a connection to the Internet.

Mobile container 101 further includes power system components 102, batteries 103 (e.g., batteries using lithium polymer or graphene materials), processing components 104, and network components 106. Bi-directional power connection 131 connects power system components 102 and batteries 103 permitting electrical power to flow in both directions. Unidirectional power connections 133 and 136 connect batteries 103 to processing components 104 and network components 106 respectively. Unidirectional power connections 132 and 134 power system components 102 to processing components 104 and network components 106 respectively. Power connections 132 and 133 can be used to provide power to processing components 104. Power connections 134 and 136 can be used to provide power to network components 106.

Unidirectional digital connection 141 connects processing components 104 power system components 102. Processing components 104 can use unidirectional digital connection 141 to send commands to power system components 102. Commands can include switching from grid power 111 to local renewable power source 112 or vice versa or switching from generator power to batteries 103 or vice versa.

Bidirectional digital connection 142 connects processing components 104 and network components 106. Data received over network 113 and data to be sent over network 113 can be exchanged between processing components 104 and network components 106 via digital connection 142.

Power system components 102 can receive electrical power 122 from grid power 111 and/or renewable power source 112 as appropriate. Based on weather in environment 100 (e.g., sunny vs. cloudy, windy vs. calm, etc.), more or less of electrical power 122 can be provided by renewable power source 112. When power generation at renewable power source 112 exceeds power consumption of components within and/or attached to mobile container 101, electrical power 121 can be put back onto grid power source 111 and/or power stored in batteries 103. Power system components 104 can process power from renewable power source 112 to clean the power for transmission on grid power 111.

In one aspect, mobile container 101 includes a specialized renewable energy connector adaptor for mechanically connecting renewable power source 112 to mobile container 101 and electrically connecting renewable power source 112 through to power system components 102.

Network components 106 can exchange network communication 123 with network 113. In one aspect, network components 106 receive instructions to perform a distributed ledger operation from another component via network communication 123. Network components 106 send the instructions to processing components 104. Processing components 104 execute the instructions to compute results. Processing components 104 send the results to network components 106. Network components 106 return the results to the component via network communication 123.

More specifically, network components 106 can receive requests to validate transactions (or portions thereof) for a cryptocurrency public distributed ledger (e.g., performing block chain computations). Network components 106 sends the requests to processing components 104. Processing components 104 process the requests and sends results of processing (e.g., validating or not validating a transaction) to network components 106. Network components 106 send the results back to the requester over network 113.

Network components 106 can also repeat, amplify, or generate a wireless signal as described.

Figure 2:
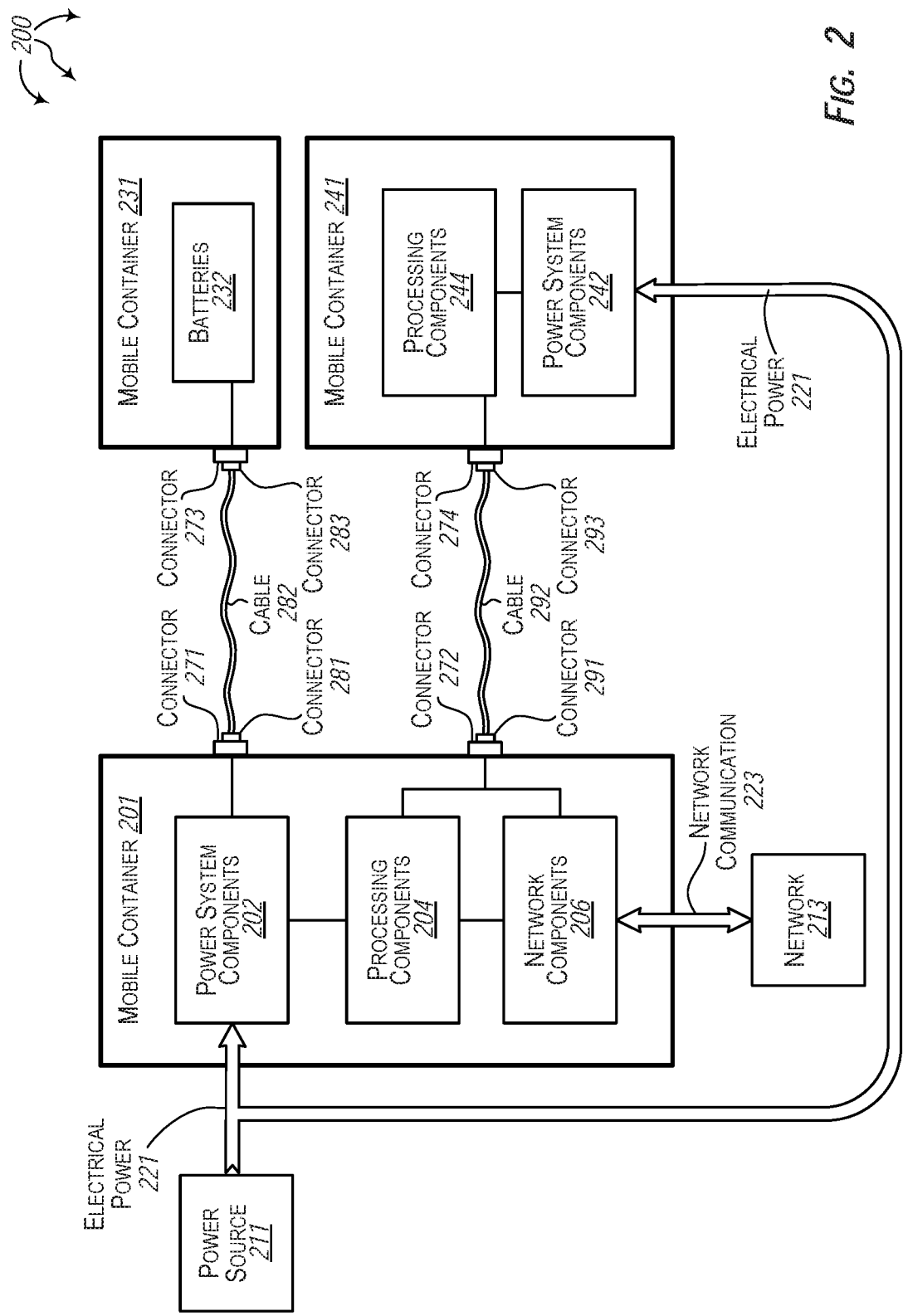
FIG. 2 illustrates an example mobile container system architecture for providing and managing digital and analog resources.

FIG. 2 illustrates an example architecture using a mobile container system in an environment 200 to provide and manage digital and analog resources. As depicted, environment 200 includes mobile containers 201, 231, and 241, power source 211, and network 213.

Mobile container 201 includes power system components 202, processing components 204, network components 206, and connectors 271 and 272. It may be that network 213 is a high speed connection, providing significant throughput of network communication 223. It may also be that electrical power 221 is highly reliable and relatively cheap compared to other power. Mobile container 201 can be placed into environment 200 to take advantage of high speed network 213 and reliable cheap power from power source 211. Connectors 271 and 272 can be used to connect mobile container 201 to other compatible mobile containers.

Overtime, the reliability of power source 211 may have degraded (e.g., due to increased load in other environments) causing brown outs or short duration blackouts. However, due to cheap cost of electrical power 221, it may be desirable to keep mobile container 201 in environment 200. To mitigate reliability issues with power source 211, batteries can be added into environment 200.

For example, mobile container 231 can be added into environment 200. Mobile container 231 includes batteries 232 and connectors 273 and 274 for connecting to other compatible mobile containers. Cable 282 includes connectors 281 and 283. Cable 282 can be smart cable including processing resources. Connector 281 and can be coupled to connector 271. Cable 282 can determine that mobile container 201 is a compatible mobile container. Mobile container 201 can determine that cable 282 is a compatible cable.

Connector 283 and can be coupled to connector 273. Cable 282 can determine that mobile container 231 is a compatible mobile container. Mobile container 231 can determine that cable 282 is a compatible cable. When the connection is completed, mobile container 201 can determine that mobile container 231 is a compatible mobile container and vice versa. Once connected, power system components 202 can charge batteries 232. Batteries 232 can be used to power processing components 204 and network components 206 during a brown out or black out. Thus, cable 282 facilitates interoperation between components in mobile container 201 and components in mobile container 231.

It may also be that overtime the processing load received via network 213 becomes too great for processing components 204 to efficiently handle. To increase processing capabilities, additional processing components can be added into environment 200.

For example, mobile container 241 can be added into environment 200. Mobile container 231 includes power system components 242, processing components 244, and connector 277 for connecting to other compatible mobile containers. Cable 292 includes connectors 291 and 293. Cable 292 can be smart cable including processing resources. Connector 291 and can be coupled to connector 272. Cable 292 can determine that mobile container 201 is a compatible mobile container. Mobile container 201 can determined that cable 292 is a compatible cable.

Connector 293 and can be coupled to connector 277. Cable 292 can determine that mobile container 241 is a compatible mobile container. Mobile container 241 can determine that cable 292 is a compatible cable. When the connection is completed, mobile container 201 can determine that mobile container 241 is a compatible mobile container and vice versa. Once connected, network components 206 can offload some computing load to processing components 244. Thus, cable 292 facilitates interoperation between components in mobile container 201 and components in mobile container 241.

Power system components 242 may also charge batteries 232 via conductors in cables 292 and 282. Batteries 232 can also be used to power processing components 244 during a brown out or black out via the conductors in cables 292 and 282.

In an alternative arrangement, additional connectors and an additional cable are used to directly connect mobile container 231 and mobile container 241.

Mobile containers 201, 231, and 241 can be modularly combined to scale vertically, horizontally, or through other external physical connectivity.

Subsequently, the reliability of power source 211 can significantly improve reducing the value of batteries 232. As such, mobile container 231 can be disconnected and possibly moved to a different location.

In one aspect, it may also be that overtime the processing load received via network 213 becomes too great for processing components 204 and processing components 242 to efficiently handle. To increase processing capabilities, additional processing components can be added into environment 200. For example, a further mobile container can be connected in environment 200 or mobile container 201 or 241 can be re-configured to add additional processing components.

In another aspect, it may also be that over time the processing load received via network 213 is significantly reduced resulting in processing system components 242 being idle. As such, mobile container 231 can be disconnected and possibly moved to a different location.

Various different types of software and/or firmware can be run on a mobile container or run on a mobile container system either separately or concurrently. In one aspect, software is configured to switch between validating operations on various different distributed ledgers, for example, block chain networks, based on received and/or sent signals or locally loaded software. A container can switch between different validating operations based on available hardware, power, and signals.

A "switch" between systems, distributed ledgers, coins, blockchain networks, etc. can be based on signals received via network communication at a mobile container or mobile container system and/or based on local generated signals. Switching can help computing miners maximize computational opportunity based on available hardware, power and signals available at a mobile container. Computational opportunity can vary between different mobile containers. Computation opportunity can also differ from between different miners to miner, for example, based on hardware type, chip type, market demands, etc. In general, mobile containers and associated components can be efficiently and effectively adapted and upgraded to adjust to dynamic and evolving circumstances of block chain networks and environments.

In one aspect, software interacts with a distributed ledger to store and/or retrieve value, such as, cryptocurrency or other reward, associated with a user. More specifically, software can store cryptocurrency associated with the purchase and sale of electrical power in a distributed ledger. A user can obtain the cryptocurrency as a reward for validating distribute ledger operations. The user can use the cryptocurrency to purchase electrical power or can exchange for other value. Those receiving the cryptocurrency can then use the received cryptocurrency to purchase electrical power.

Mobile containers and mobile container systems can also run software that monitors component health with the mobile container or mobile container system. Locally or via network communication, component health status can be displayed at a user-interface (e.g., a dashboard). Administrators can monitor component health to help maintain computation and program effectiveness at a mobile container or mobile container system.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The various components depicted in described computer architectures can be connected to (or be part of) a network, such as, for example, a system bus, a Local Area Network ("LAN"), a Wide Area Network ("WAN"), and even the Internet. Accordingly, the various components as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In some aspects, a computer system comprises one or more hardware processors and system memory. The one or more hardware processors execute instructions stored in the system memory to automatically perform any of the described functionality. In other aspects, computer implemented methods can be used to perform any of the described functionality. In further aspects, computer program products include computer-executable instructions, that when executed at a processor, cause a computer system to perform any of the described functionality.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A mobile container, comprising:
a plurality of components tailored to manage one or more of: a digital resource or an analog resource at a location based on the availability of digital, analog, and natural resources at the location to provide a resource solution at the location, the plurality of components including:
a power system component configured to connect to one or more power sources;
a network component configured to connect to one or more networks;
processing components configured to perform computational operations at the mobile container including determining compatibility with other mobile containers and determining compatibility with cables;
an electrical connection configured to distribute electrical power from the power system component to an electrical grid external to the mobile container;
a digital connection configured to accept a compatible cable and communicate with compatible mobile containers external to the mobile container via the compatible cable; and
mechanical connections for mechanically coupling to other mobile containers.

2. The mobile container of claim 1, wherein a plurality of components tailored to manage one or more of: a digital resource or an analog resource at a location comprises the plurality of components tailored to generate the electrical power based on the availability of natural resources at the location.

3. The mobile container of claim 1, wherein a plurality of components tailored to manage one or more of: a digital resource or an analog resource at a location comprises the network component configured to repeat a wireless signal into an underserved area.

4. The mobile container of claim 1, wherein the plurality of components includes a battery connected to the power system component.

5. The mobile container of claim 1, wherein the power system component configured to connect to one or more power sources comprises the power system component configured to a renewable energy source selected from among: a solar panel, a wind turbine, or a hydroelectric generator.

6. The mobile container of claim 5, wherein the electrical connection configured to distribute power from the power system component to an electrical grid external to the mobile container comprises the electrical connection connected to mains power.

7. The mobile container of claim 1, wherein the network component configured to connect to one or more networks comprises the network component configured to connect to a wired network and to generate a wireless network.

8. The mobile container of claim 1, wherein the network component configured to connect to one or more networks comprises the network component configured to propagate a signal for satellite communication.

9. A mobile container system, the mobile contain system including:
a first mobile container comprising a first one or more of components;
a second mobile container comprising a second one or more components; and
a mechanical connection mechanically connecting external surfaces of the first mobile container and external surfaces of the second mobile container to one another;
a second mechanical connection connecting the first mobile container to the second mobile container utilizing a processor equipped cable mechanically connected to the first mobile container and mechanically connected to the second mobile container to facilitate digital connection and interoperation between the first one or more components and the second one or more components as a plurality of components;
wherein the processor equipped cable is configured to:
determine compatibility between the first one or more components and the second one or more components; and
transmit data between the first mobile container and the second mobile container over the digital connection subsequent to determining compatibility between the first one or more components and the second one or more components; and
wherein the plurality of components are tailored to manage one or more of: a digital resource or an analog resource at a location based on the availability of digital resources, analog resources, and natural resources at the location to provide a resource solution at the location, the plurality of components including:
a power system component configured to connect to one or more power sources;
a network component configured to connect to one or more networks;
processing components configured to perform computational operations at the mobile container; and
an electrical connection configured to distribute electrical power from the mobile container system to an electrical grid external to the mobile container system.

10. The mobile container system of claim 9, wherein first mobile container and the second mobile container are of essentially the same size.

11. The mobile container system of claim 9, wherein first mobile container and the second mobile container are of different sizes.

12. The mobile container system of claim 9, wherein a plurality of components including a power system component comprises the plurality of components tailored to generate the electrical power based on the availability of natural resources at the location.

13. The mobile container system of claim 9, wherein a plurality of components tailored to manage one or more of: a digital resource or an analog resource at a location comprises the network component configured to repeat a wireless signal into an underserved area.

14. The mobile container system of claim 9, wherein the plurality of components includes a battery connected to the power system component.

15. The mobile container system of claim 9, wherein the power system component configured to connect to one or more power sources comprises the power system component configured to a renewable energy source selected from among a: solar panel, a wind turbine, or a hydroelectric generator.

16. The mobile container system of claim 15, wherein the electrical connection configured to distribute power from the power system component to an electrical grid external to the mobile container system comprises the electrical connection connected to mains power.

17. The mobile container system of claim 9, wherein the network component configured to connect to one or more networks comprises the network component configured to connect to a wired network and to generate a wireless network.

18. The mobile container system of claim 9, wherein the network component configured to connect to one or more networks comprises the network component configured to propagate a signal for satellite communication.

19. The mobile container system of claim 9, wherein a mechanical connection mechanically connecting external surfaces of the first mobile container and external surfaces of the second mobile container to one another comprises the mechanical connection connecting the first container and the second container in a vertical arrangement wherein the second mobile container is substantially directly above the first mobile container.

20. The mobile container system of claim 19, wherein the second mobile container comprises the second mobile container substantially the same size as the first mobile container.

* * * * *